No. 857,494. PATENTED JUNE 18, 1907.
W. E. SLATER.
MOTOR VEHICLE STEERING GEAR.
APPLICATION FILED MAY 31, 1906.
2 SHEETS—SHEET 1.
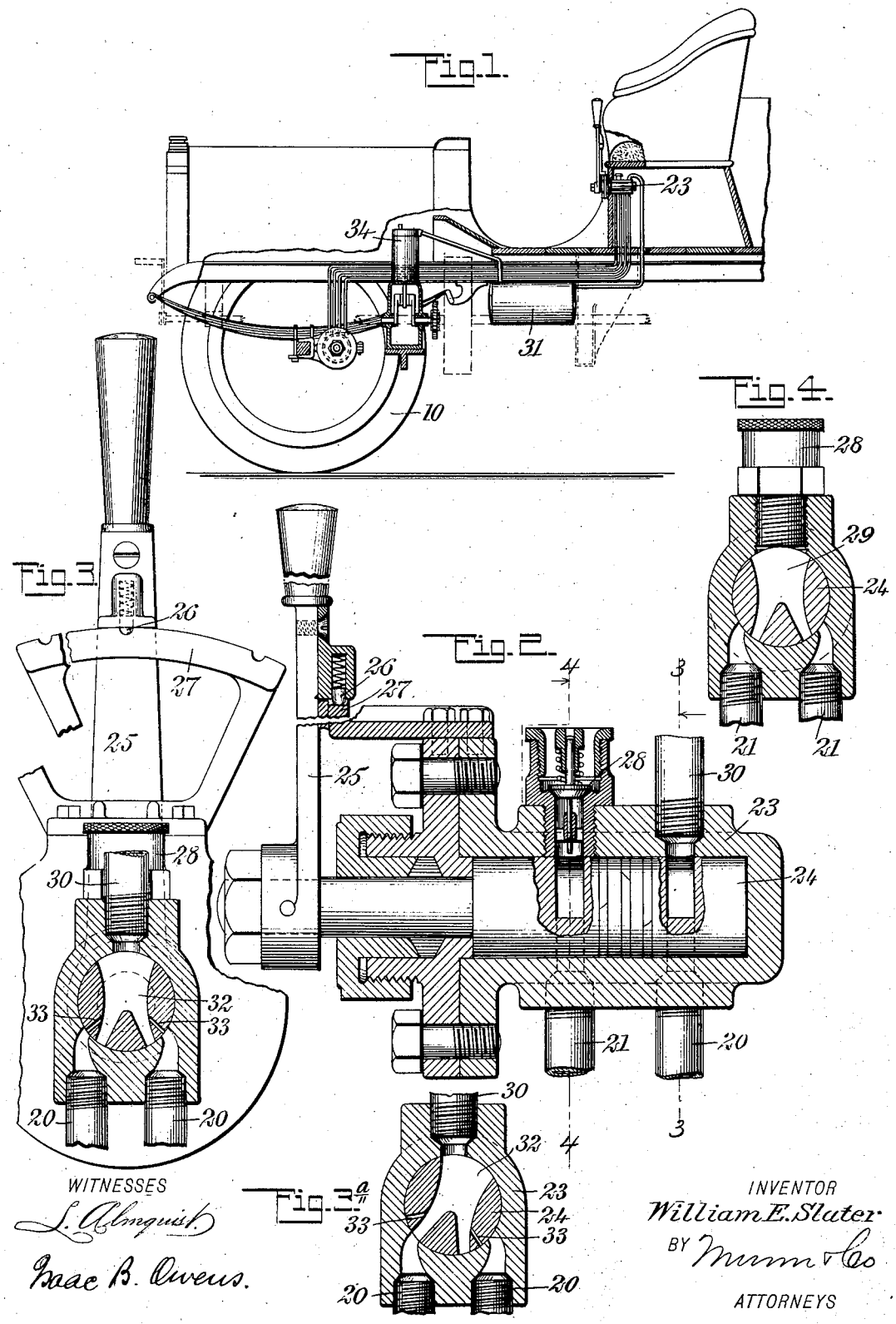
WITNESSES
L. Almquist
Isaac B. Owens.
INVENTOR
William E. Slater
BY Munn & Co
ATTORNEYS No. 857,494. PATENTED JUNE 18, 1907.
W. E. SLATER.
MOTOR VEHICLE STEERING GEAR.
APPLICATION FILED MAY 31, 1906.
2 SHEETS—SHEET 2.
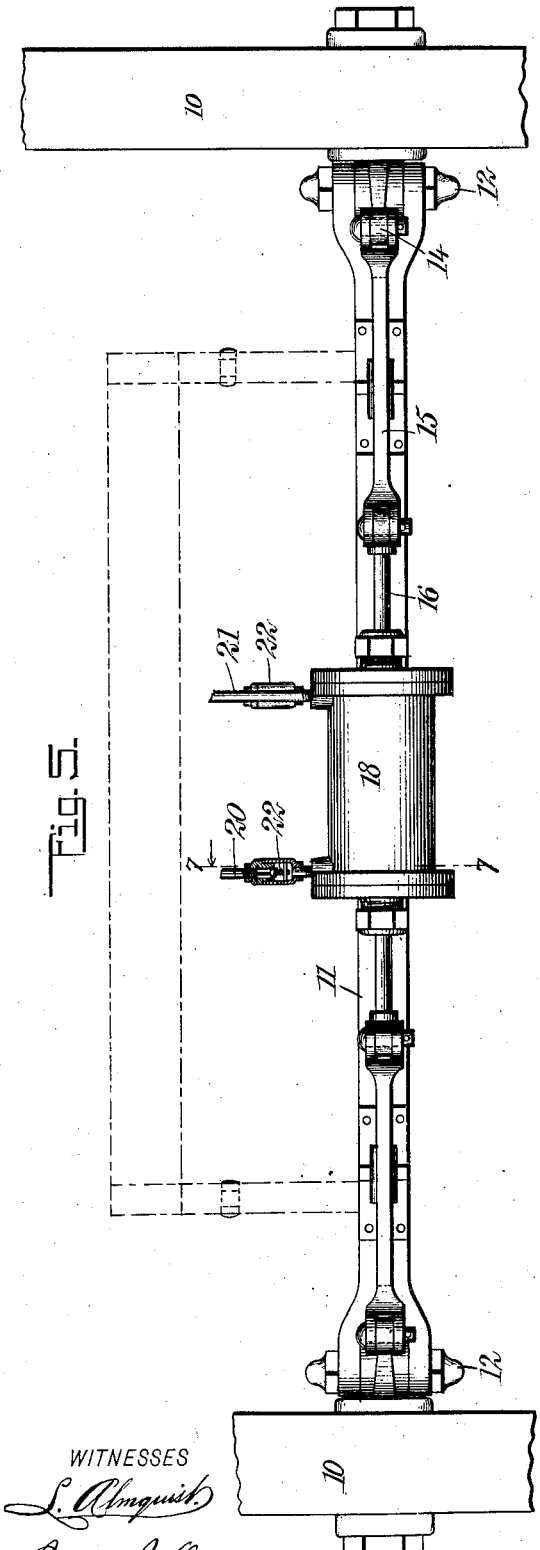
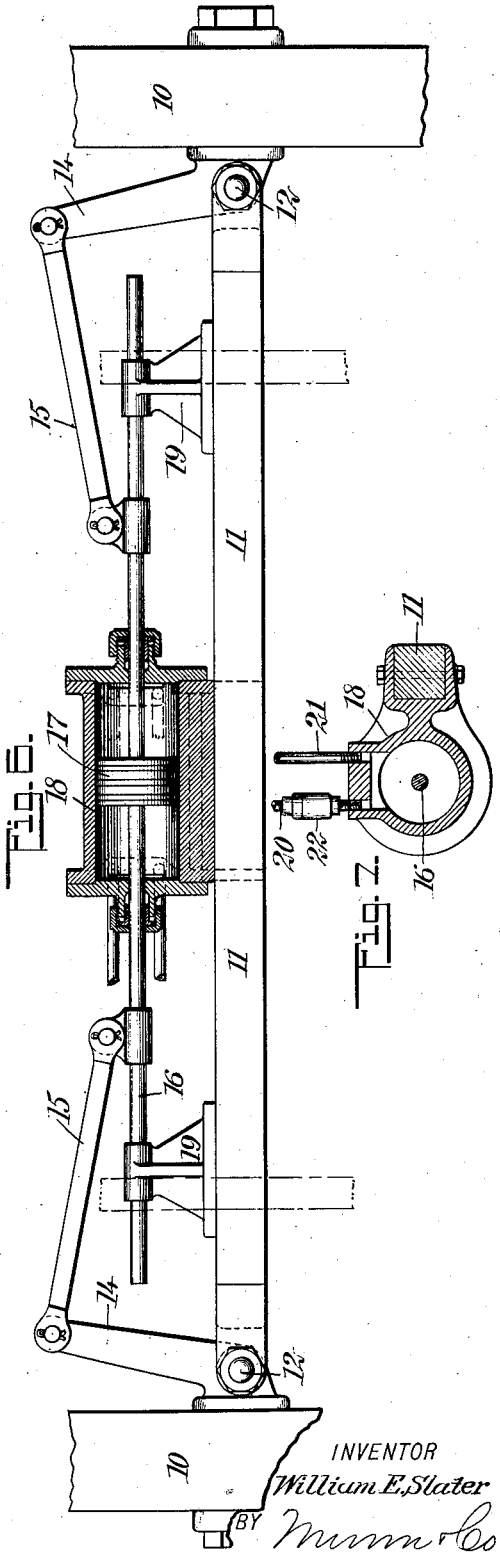
WITNESSES
INVENTOR
William E. Slater
BY
ATTORNEYS

UNITED STATES PATENT OFFICE.

WILLIAM EDWARD SLATER, OF SAN FRANCISCO, CALIFORNIA.

MOTOR-VEHICLE STEERING-GEAR.

No. 857,494.      Specification of Letters Patent.      Patented June 18, 1907.

Application filed May 31, 1906. Serial No. 319,498.

*To all whom it may concern:*

Be it known that I, WILLIAM EDWARD SLATER, a citizen of the United States, and a resident of San Francisco, in the county of San Francisco and State of California, have invented a new and Improved Motor-Vehicle Steering-Gear, of which the following is a full, clear, and exact description.

My invention relates to a mechanism for steering automobiles by means of fluid pressure.

In its preferred embodiment the steering road wheels of the vehicle are connected with the motor cylinder, the admission or exhaust of fluid pressure to and from the same being under the control of a multiple valve placed within convenient reach of the driver of the machine, and the fluid pressure being stored in the reservoir which in turn is charged by a pump coupled with the engine of the vehicle or with some other suitable driving element.

The invention resides in certain special features of construction and arrangement of parts, and all will be fully set forth hereinafter and particularly pointed out in the claims.

Reference is to be had to the accompanying drawings which illustrate as an example the preferred embodiment of my invention, in which drawings—

Figure 1 is a partial side view of a vehicle showing my invention applied; Fig. 2 is a longitudinal sectional view of the controlling valve; Fig. 3 is a cross section on the line 3—3 of Fig. 2; Fig. 3ª is a sectional view similar to Fig. 3 but showing the valve in charging adjustment; Fig. 4 is a cross section on the line 4—4 of Fig. 2; Fig. 5 is a rear elevation of the motor cylinder showing its connection with the steering road wheels; Fig. 6 is a sectional plan view of the same; and Fig. 7 is a cross section on the line 7—7 of Fig. 5.

As shown best in Figs. 5 and 6, the steering road wheels 10 of the vehicle are mounted on the axle 11 by the usual knuckles 12, with which knuckles arms 14 are connected and these in turn are joined by links 15 to the rod 16 of a piston 17 operating in the motor cylinder 18. The rod 16 is guided in its transverse reciprocation by means of brackets 19 carried by the axle 11, and from this arrangement it is clear that as the piston 17 is moved in the cylinder 18 from one end to the other, the wheels 10 will be slued or canted in one direction or the other according to the movement of the piston, whereby to steer the vehicle.

With each end of the cylinder 18 communicates a pressure supply pipe 20, and an exhaust pipe 21. Said supply pipe 20 is fitted with a check valve 22 which prevents the return of pressure from the cylinder through the pipe, and these pipes 20 and 21 lead to the multiple controlling valve casing 23. Said casing is located in any convenient point on the automobile or motor vehicle. As shown in Fig. 1 it is arranged under the seat of the driver, and as shown in Fig. 2 the valve casing incloses a plug 24 having connected to its stem a handle 25, this handle carrying a spring pawl 26 which coacts with a suitable quadrant 27 attached to the casing of the valve, or to any other stationary part. The two exhaust pipes 21 lead to the casing 23 at a point opposite the exhaust check valve 28 (see Figs. 2 and 4), and the valve plug 24 is provided with passages 29 so that by rocking the valve to one position or the other the pipe 21 is placed in communication with the check valve 28 which permits the exhaust of the pressure to the atmosphere. The two pressure supply pipes 20 communicate with the casing 23 opposite the pipe 30, which leads from the pressure reservoir 31. This communication of the pipes 20 with the casing 23 is shown in Figs. 2, 3 and 3ª, and the plug 24 of the valve is provided with a passage 32, so that by rocking the valve pressure is permitted to enter one or the other of the pipes 20. Said plug 24 of the valve is also provided with lead supplying ports 33 which when the valve is in the intermediate position shown in Fig. 3 communicate respectively with the pressure supply pipes 20 and supply pressure thereto, making up for the leakage from the various fluid pressure connections. The reservoir 31 is mounted at any suitable point on the vehicle. As shown in Fig. 1 it is located under the floor of the vehicle body, and it is supplied by a pump 34 which may be driven from the engine or from any other suitable source.

In the use of the apparatus in order to shift the steering road wheels 10, the valve plug 24 should be thrown, for example, to the position shown in Fig. 3ª, thus admitting pressure to one of the pipes 20 by which the pressure is led to the corresponding end of the cylinder 18, thus starting the movement of the piston 17 away from said end, and the said adjustment of the plug 24 also results in placing the exhaust pipe 21 which communicates with the opposite end of the cylinder 18 in communication with the exhaust valve 28, so that as pressure is supplied to one end of the cylinder 18 it is permitted to exhaust from the other. Upon a reversal of the valve a reversal of the disposition of pressure takes place, and consequently the movement of the piston 17 is reversed. In this manner the movement of the piston, and hence the adjustment of the wheels 10, may be controlled at will. Upon returning the valve plug 24 to its intermediate position the piston 17 and its connections will retain the positions to which they have been moved, and a small quantity of pressure is supplied to the ports 33 to account for leakage, thus insuring the maintenance of said parts in said position. It will be observed that the steering operation can be effected by merely throwing the handle 25 in operation, which requires a minimum expenditure of strength and, therefore, may be effected quickly and the extent of movement more accurately gaged than with apparatus in which the steering must be effected by correspondingly great expenditure of strength.

Having thus described the preferred form of my invention, what I actually claim and desire to secure by Letters Patent is:—

1. A motor vehicle, comprising a motor cylinder, means for connecting said cylinder with the steering wheel or wheels of a vehicle, a source of pressure supply, means for controlling the passage of said fluid to said cylinder, comprising a valve casing, a valve plug mounted therein and provided with a plurality of passages, supply pipes connecting certain of said passages with the opposite ends of the cylinder, exhaust pipes connecting other of said passages with the opposite ends of the cylinder, a pipe connecting the first mentioned passages with the source of fluid supply, and a spring-pressed check valve in communication with the second mentioned passages.

2. In a device of the class described, a cylinder, a piston operating therein, a source of fluid pressure supply, a valve casing, a conduit connecting said valve casing with the source of fluid pressure supply, a supply pipe and an exhaust pipe connecting said valve casing to each end of the cylinder, and a valve plug within said valve casing, provided with a plurality of passages therethrough adapted when in one position to connect the source of fluid supply to one side of the piston and permit the exhausting from the opposite side, and when in a second position to connect the source of fluid supply to the second mentioned side of the piston and permit the exhausting from the first mentioned side.

3. A motor vehicle having a motor cylinder, a piston operating therein, connections between the piston and the steering wheel or wheels of the vehicle, a source of fluid pressure supply, a valve casing, independent supply and exhaust pipes leading from said valve casing to each end of the cylinder, a conduit connecting said valve casing with the source of fluid pressure supply, and a valve plug within the valve casing provided with a plurality of passages, one of said passages having a branch in communication with the source of fluid pressure supply and separate branches adapted to be alternately placed in communication with the separate supply conduits to the cylinder, and the second passage having one branch opened to the atmosphere and separate branches adapted to be alternately placed in communication with the separate exhaust conduits from the ends of the cylinder.

4. In a device of the class described, a motor cylinder, a source of fluid pressure supply, a valve casing, a conduit connecting said valve casing with the source of fluid pressure supply, separate conduits connecting said valve casing with the opposite ends of the cylinder, and a valve plug within said valve casing and provided with a passage therethrough, said passage having a branch in communication with the source of fluid pressure supply, secondary branches in communication with the first mentioned branch and each adapted to be placed in communication with one of the supply conduits to the cylinder, and smaller branches in communication with the first mentioned branch and each normally communicating with supply conduits to the cylinder.

5. In a device of the class described, a cylinder, a source of fluid pressure supply, a valve casing, a conduit connecting said valve casing with the source of fluid pressure supply, a conduit connecting said casing with the atmosphere, a supply conduit and an exhaust conduit connecting said casing with each end of the cylinder, and a valve plug within the valve casing, said valve plug having a plurality of passages therein and adapted to normally supply motive fluid simultaneously to both ends of the cylinder, and when rotated to the proper position, to shut off the supply to either end and open the exhaust from the opposite end to the atmosphere.

In testimony whereof I have signed my name to this application in the presence of two subscribing witnesses.

WILLIAM EDWARD SLATER.

Witnesses:
HUGO A. HORNLEIN,
ROBERT A. McLEAN.